US008257608B2

(12) United States Patent
Filler et al.

(10) Patent No.: US 8,257,608 B2
(45) Date of Patent: Sep. 4, 2012

(54) PROCESS AND COMPOSITION FOR FROTH FLOTATION

(76) Inventors: Paul A. Filler, Sulphur, LA (US); Duane J. Lewis, Lake Charles, LA (US)

( * ) Notice: Subject to any disclaimer, the term of this patent is extended or adjusted under 35 U.S.C. 154(b) by 0 days.

(21) Appl. No.: 13/365,751

(22) Filed: Feb. 3, 2012

(65) Prior Publication Data

US 2012/0132844 A1 May 31, 2012

Related U.S. Application Data

(62) Division of application No. 11/658,783, filed as application No. PCT/US2006/004379 on Feb. 8, 2006, now Pat. No. 8,136,669.

(60) Provisional application No. 60/650,857, filed on Feb. 8, 2005.

(51) Int. Cl.

| | |
|---|---|
| ***B03D 1/006*** | (2006.01) |
| ***B03D 1/008*** | (2006.01) |
| ***B01D 1/02*** | (2006.01) |

(52) U.S. Cl. ........................................ 252/61; 209/166

(58) Field of Classification Search .................... 252/61; 209/166

See application file for complete search history.

(56) References Cited

U.S. PATENT DOCUMENTS

| | | | | | |
|---|---|---|---|---|---|
| 4,416,769 | A | * | 11/1983 | McCaffrey et al. | 209/166 |
| 4,476,013 | A | * | 10/1984 | McCaffrey | 209/166 |
| 4,528,107 | A | * | 7/1985 | McCaffrey et al. | 252/61 |

* cited by examiner

*Primary Examiner* — Thomas M Lithgow

(74) *Attorney, Agent, or Firm* — Bushman & Associates, P.C.

(57) ABSTRACT

A method for conducting froth flotation using a collector which is primarily hydrocarbon in nature or is a mixture of hydrocarbons with certain oxygenates, the collectors being substantially free of polynuclear aromatics, sulfur and nitrogen.

1 Claim, No Drawings

PROCESS AND COMPOSITION FOR FROTH FLOTATION

CROSS REFERENCE TO RELATED APPLICATION

This application is a divisional of U.S. Ser. No. 11/658,783, filed Oct. 7, 2008 now U.S. Pat. No. 8,136,669 which is a 371 application of PCT/US06/04379 filed Feb. 8, 2006, which claims priority from U.S. Provisional Application No. 60/650,857 filed Feb. 8, 2005, all of which are incorporated herein by reference for all purposes.

BACKGROUND OF THE INVENTION

1. Field of the Invention

The present invention relates to froth flotation of solid materials and, more particularly, to a process and composition for the froth flotation of coal, molybdenum, graphite, and other materials having hydrophobic materials.

2. Description of Prior Art

When coal is mined, the raw product consists of coal and rock, with rock naturally occurring as small partings within the coal that cannot be avoided during the mining process. To concentrate the coal, large fragments of non-combustible mineral/matter are removed by screening or gravity separation techniques. Froth flotation is commonly used to beneficiate the finely divided raw coal. Certain coals such as Bituminous coals possess a natural hydrophobicity, which results in the coal being naturally floatable in the aqueous medium, but the use of reagents is still commonly required to enhance floatability and therefore recovery. Effective preparation of coal prior to combustion improves the homogeneity of coal supplied, produces less ash for disposal at power plants and other use sources, and reduces emissions of oxides of sulfur. Froth flotation/coal washing is an important method for reducing ash in coal. Washing the ash and coal is particularly critical for reducing sulfur, especially in coal fields in the Eastern United States.

During coal washing, the ore is crushed and wet ground to obtain a pulp. A frothing agent, usually employed with a collecting agent, is added to the coal/water slurry to effect the flotation. The coal slurry is aerated to produce froth at the surface thereof and the collector assists the frothing agent in separating the coal from the ore by causing the mineral values, i.e., the coal, to adhere to the bubbles formed during the aeration process. The portion of the ore which is not carried over with the froth is usually identified as flotation tailings or gangue and is disposed of or reprocessed. The purpose of the collector is to increase the hydrophobicity of the coal particles to permit better attachment to the bubbles which are considered hydrophobic. The purpose of the frothing agent is to stabilize bubbles and provide for a significant concentration of fine bubbles for attachment to the coal. The difference in density between the air bubbles and water provides buoyancy that preferentially lifts the hydrophobic solid particles to the surface where they remain entrained in the froth which can be drained off or mechanically skimmed away thereby effecting separation.

Collectors used in froth flotation of coal generally comprise hydrocarbon oils of which distillate oils such as kerosene, industrial diesel fuel and fuel oil are some of the most widely used, especially kerosene. While in the past collectors included hydrocarbons produced as coke-oven byproducts, the use of these materials has been largely discontinued since they contain phenols and other toxic aromatic hydrocarbons that pose ecological problems. Accordingly today the most widely used collectors are diesel or kerosene, i.e., middle distillate cuts. The problem with these middle distillate hydrocarbons is that they may contain significant amounts of polynuclear aromatics by up to 15% by wt., which result in increased levels of carcinogenicity and toxicity. Additionally these middle distillates, e.g., kerosene, diesel, contain significant concentrations of certain materials listed as "priority pollutants" (Clean Water Act). Diesel oil contains other HAPS listed materials such as benzene, toluene, ethybenzene, etc. in amounts ranging from about one-half to about 2% by wt. These materials are also highly toxic and pose problems with ground water contamination.

SUMMARY OF THE INVENTION

As noted above, the present invention relates generally to the froth flotation of solid materials and not merely to that of raw coal. Thus, the present invention is directed to compositions and methods for use in the froth flotation of other materials, e.g., in mineral recovery, wherein the material has a hydrophobic component. As is well known presently at least 100 different minerals, including almost all of the world's copper, lead, zinc, nickel, silver, manganese, chromium, cobalt, tungsten and titanium, are produced using froth flotation. Additionally, froth flotation has been applied in non-mineral industries including water purification, paper de-inking, and chemical, plastics, and food processing.

According to one aspect of the present invention, there is provided a collector composition (Collector A) for use in a method for the froth flotation of solid materials, e.g., hydrocarbonaceous materials such as coal, the Collector A composition comprising hydrotreated isoparaffins and cycloparaffins containing low levels of polynuclear aromatics, i.e., less than 0.2% by weight, generally in the ppm range.

In certain cases when the degree of hydrotreating has been less severe, there is provided a second collector, Collector $A_1$ composition which can contain, in addition to the above components of Collector A, up to about 15% by weight low molecular weight, alkylbenzenes, but still low levels of polynuclear aromatics, i.e., in the ppm range. Collector $A_1$ compositions like Collector A compositions are also generally characterized by very low levels of normal paraffins. Additionally, Collectors A and $A_1$ exhibit very low levels of sulfur and nitrogen, typically less than 1% by wt. and usually less than 0.1% by wt. Indeed, preferred Collector A and $A_1$ compositions contain less than 0.01% by wt. sulfur and nitrogen, generally in the ppm range.

According to another aspect of the present invention, there is provided a collector composition (Collector B) for use in a method for the froth flotation of solid materials, e.g., hydrocarbonaceous materials such as coal, the Collector B composition comprising a mixture of linear mono- di- and trialkylbenzenes. Generally Collector B can comprise from about 5 to about 15% monoalkylbenzenes, from about 45 to 85% dialkylbenzene and up to about 30% trialkylbenzenes, all by weight. In the case of the monoalkylbenzenes, the total number of carbons in the alkyl chains will vary from about 11 to 16 carbon atoms. In the case of the dialkylbenzenes, the total number of carbon atoms in the alkyl groups will be from 22 to 38 while in the trialkylbenzenes the total number of carbons in the alkyl groups will be from 18 to 48.

In still another aspect of the present invention, there is provided a novel collector composition (Collector C). Collector C comprises from 30-45% paraffins, 5-30% olefins, 10-15% cycloparaffins, 10-15% esters, and 1-6% other oxygenates, all by weight.

Thus, in one aspect, the present invention comprises subjecting a solid product, preferably containing a solid hydrocarbonaceous material, e.g., coal, to froth flotation in the presence of a suitable frothing agent and an effective amount of a collector selected from Collector A, Collector $A_1$, Collector B, Collector C and mixtures thereof, as described above. It is contemplated that various mixtures of Collectors A, $A_1$, B, and C can be used in the froth flotation process of the present invention. Thus, mixtures of A and B, $A_1$ and B, A and C, B and C, $A_1$ and C, A, $A_1$, B and C, etc., may be employed in the process of the present invention.

DESCRIPTION OF THE PREFERRED EMBODIMENTS

The composition referred to herein as Collector $A_1$ can conveniently be derived from a kerosene or other middle distillate hydrocarbon stream by hydrotreating the kerosene to remove polynuclear aromatics, sulfur and nitrogen and then removing the linear paraffins from the hydrotreated kerosene stream by a suitable process such as the Molex® process, marketed by UOP. The Molex® process separates the linear paraffins from the isoparaffins (branched paraffins) cycloparaffins, and ~15% by wt. aromatics, primarily alkylbenzenes using molecular sieve technology. This nonlinear stream is referred to as raffinate and is one composition that can comprise Collector $A_1$. Collector $A_1$ will comprise a composition of from 30-70% by wt. paraffins, 30-70% by wt. naphthenes, and approximately 15% by wt. aromatic compounds, e.g., alkylbenzenes, primarily monoalkylbenzenes. A particularly desirable Collector $A_1$ is marketed under the name ODC-15 by SASOL North America Inc. Physical and chemical properties of ODC-15 are set forth in a publically available Technical Data Sheet of SASOL North America Inc. entitled ODC-15 Drilling Fluid Base Oil Rev. 01/03 attached as Appendix I and incorporated herein by reference for all purposes.

By further hydrotreating the raffinate, the alkylbenzenes are saturated providing a second collector composition, Collector A, comprised of saturated cyclic or ring compounds (naphthenes), together with the original branched paraffins and cycloparaffins. A typical composition for Collector $A_1$ comprises 30-70% by wt. paraffins, 30-70% by wt. naphthenic compounds and less than 1%, preferably less than 0.5% aromatic compounds. A particularly desirable Collector $A_1$ composition comprise 45% by wt. paraffins, 55% by wt. naphthenes, and 0.2% by wt. aromatics, marketed under the name LPA® by SASOL North America Inc. The composition and other physical properties of the LPA® as well as other suitable solvents which can be used as Collector $A_1$ are set forth in a publicly available Technical Data Sheet of SASOL North America Inc. entitled LPA® Solvents Rev. 01/03 attached as Appendix II and incorporated herein by reference for all purposes.

The composition referred to herein as Collector B is a secondary stream in the manufacture of linear alkylbenzenes (LAB). This secondary stream, referred to as alkylate, is generally produced directly as a remaining product via distillation of the alkylation feed stocks (benzene and paraffin) and the LAB. These alkylates or alkylate bottoms can further be distilled to produce products with different average molecular weights, different viscosities, etc. These alkylate bottoms, depending upon their source, can have a distribution of linear mono, di- and tri- alkylbenzenes, the monoalkylate being present in an amount of from about 5 to 15%, the dialkylate being present in an amount of from about 45 to 85% by wt. and the trialkylate being present in an amount of up to 30% by wt. Generally speaking, the monoalkylates are alkylbenzenes wherein the total number of carbons in the alkyl side chains are from 11 to 14 carbon atoms. In the case of the dialkylbenzenes, the total number of carbons in the alkyl side chains will be from 8 to 30 carbon atoms, while in the trialkylbenzenes the total number of carbon atoms in the alkyl side chains will be from 18 to 36 carbon atoms. It will be understood that these alkylate bottom streams can be distilled so as to produce linear alkyl benzene compositions of the desired distribution, e.g., predominantly di- and trialkylbenzenes with up to 15% by weight monoalkylbenzenes. The Collector B composition will generally have an average molecular weight of from about 246 to about 667. In general, a preferred Collector B composition comprises an alkylbenzene stream made up of primarily di- and tri- alkylbenzenes with the carbon number ranges described above. Collector B, like Collector A, will contain negligible to no polynuclear aromatics, sulfur and nitrogen. A particularly preferred Collector B is marketed as V-154L Specialty Alkylate by SASOL North America Inc. V-154L is described as to various physical and chemical properties in a publically available Technical Data Sheet published by SASOL North America Inc. and entitled V-154L Specialty Alkylate, Rev. 01/03, attached as Appendix III and incorporated herein for all purposes.

Collector C is a novel composition and comprises a portion of the overhead compounds generated during the stripping of aluminum alkoxide in the Ziegler alcohol process. One method of obtaining Collector C is to feed isoparaffins (CAS 64742-47-A) into an aluminum alkyl stream as a carrier solvent in the Ziegler process, well known to those skilled in the art. During the growth step, the alkyl chains become longer and some by-product olefin material is created. After growth, the material is sent to an oxidation step where the aluminum alkyl is converted to aluminum alkoxide. In this step, some oxygenated by-products are also formed. The solvent/olefin/oxygenate/aluminum alkoxide stream is then sent to a stripper where the non-alkoxide components are removed as overhead. This overhead is typically denoted as SSO (Solvent Stripper Overhead). A portion of the SSO material is removed from the stripper column such that the removed material has a flash point of greater than about 140° C. The removed material is a mixture falling within the scope of Collector C. Thus, Collector C, by weight, can be a mixture of: from 30-45% linear and isoparaffins having from 4-34 carbon atoms; from 5-30% olefins and comprised of alpha olefins, internal olefins and pendent olefins, the alpha olefins generally being present in the largest amount ~23%, the internal olefins generally being present in the smallest amount ~2%; from 10-15% naphthenes, primarily 5 and 6 carbon monocyclic and bi-cyclic compounds having alkyl chains ranging from 1-10 carbon atoms; from 10-15% esters where the total number of carbon atoms is from 11-30; from 1.5-4% alcohols, primarily linear primary alcohols having from 3-15 carbon atoms and from 0.5-2% ethers containing from 4-20 carbon atoms.

As noted, a mixture of the collectors described above can be employed in the process of the present invention. Mixtures of Collectors A, $A_1$, B and C or any variation thereof covering a wide range of compositions can be employed. For example, one suitable mixture employs 60% by wt. Collector $A_1$ and 40% by wt. Collector B. In general the specific mixture of Collectors A, $A_1$, B and/or C, when such mixtures are employed, can be tailored to the individual application. Thus, it can be readily determined by those skilled in the art what the compositional makeup of such a mixed collector should be. For example, in a mixture comprised of Collector $A_1$ and Collector B, Collector $A_1$ can be present in an amount of from 40-90% by wt. while Collector B can be present in an amount of from about 10-60% by wt.

When used in the froth flotation process of the present invention, the collector whether it be Collector A, Collector $A_1$, Collector B, Collector C or a mixture thereof, will be used in an effective amount, i.e., an amount sufficient to enhance the hydrophobicity of the particles of the solid material, e.g., coal, to be frothed. Generally speaking, the collector, be it Collector A, $A_1$, B, C or a mixture thereof, will be present in an amount of from about 0.01 to about 5 lbs per ton of solids to be frothed present in the slurry.

As is well known to those skilled in the art, in addition to collectors, froth flotation processes employ frothing agents or frothers. Numerous materials can be used as frothers. Thus, anionic surfactants such as alkanesulphonic acid, alkenesulphonic acids, alkylsulfuric acids, alkenylsulfuric acids can be employed. Additionally, polyglycol ethers, alcohols and other well known frothing agents can be employed. Other frothing agents are set forth, for example, in U.S. Pat. Nos. 4,278,533, 4,528,107, 5,022,983, 2,094,646, and U.S. Patent Publication 2003/0146134, all of which are incorporated herein by reference for all purposes. The amount of frother employed in the process of the present invention will vary depending upon the amount/type of solid feed material, e.g., coal, being treated. In general, the frothing agent, depending on its nature will be present in amounts ranging from at least about 0.1 lb per ton of feed material, e.g., raw coal, up to about 2 lbs per ton of feed material where feed material includes both the frothable (hydrophobic) solids and non-frothable solids (gangue).

In the process of the present invention and is as well known to those skilled in the art, froth flotation of coal and other solids is generally carried out in cells. In the process of the present invention the collector and the frother may be combined before use and supplied to the froth flotation cell as a mixture or they may be fed separately to the cell if desired.

When conducting a froth flotation process according to the present invention, and as is well known to those skilled in the art, a slurry of a particulate feed material containing the desired product to be recovered, e.g., coal, together with the gangue is introduced into a suitable froth flotation vessel which can be a mechanically agitated cell, tank, or a flotation column. Generally speaking, it is necessary to grind the feed material to increase the surface area and to break the feed material into the desired product to be recovered and the gangue. The particle size of the feed material will, of course, depend upon the nature of the feed material, and the product to be recovered. According to the present invention, a mixture of the particulate feed material, in an aqueous slurry, a frothing agent, optionally other well known froth flotation additives, and one of the collectors (including a mixture) of the present invention is formed. The collectors of the present invention enhance the hydrophobicity of the product to be recovered such that under sufficient aeration to create bubbles, such particles are released from the aqueous slurry by attaching to the air bubbles which rise to the surface forming a foam. The foam is then removed and the product is separated from the foam.

As noted, froth flotation can be performed in mechanically agitated cells or tanks, or in tall flotation columns. Generally speaking, froth flotation equipment can be divided into general groups of mechanical cells, and flotation columns. Mechanical cells use a large mixture and diffuser mechanism at the bottom of the mixing tank to introduce air and provide mixing action. Froth flotation columns on the other hand use air spargers to introduce air at the bottom of a tall column while introducing the slurry containing the feed material above. The countercurrent motion of the slurry flowing down and the air flowing up provides mixing action. Mechanical cells generally have a higher throughput rate, but produce material that is of lower quality, while froth flotation columns generally have a low throughput rate but produce higher quality material.

To further illustrate the invention, the following non-limiting examples are presented.

Example 1

A plant trial at a coal mine was conducted over a three day period. The equipment employed was a typical froth flotation cell operated in a continuous fashion. The slurry composition employed, i.e., the feed to the froth flotation cell, contained 8.54% by wt. solids and the balance water, approximately 50% by wt. of the solids being feed ash. The particle size of the coal was typical with 95% being between 60 and 320 mesh. The flow rate of the slurry to the cell was approximately 1,000 gal/m while the addition rate of the collector was approximately 2 ml/min. The collector used was 100% Collector $A_1$ on day one, 80% Collector $A_1$ on day two, and 60% Collector $A_1$ on day three, the balance on days 2 and 3 being Collector B. Collector $A_1$ was ODC-15 as described above and Collector B was V-154L as described above. It was found that the average recovery of coal over the test period was 80.53% by wt. with a gangue (tailings) recovery of 82.4% by wt.

Example 2

The procedure of Example 1 was followed except that in this case the collector employed was a commercially available diesel. Using the diesel as a collector, coal recovery was 80.49% by wt. while gangue recovery was 81.92% by wt.

Thus it can be seen by comparing the results of Examples 1 and 2 that the collectors of the present invention perform as well as or better than conventional collectors (diesel) in terms of achieving recovery of coal.

Example 3

The procedure of Example 1 was followed except that in this case the collector employed was Collector C and additionally, the slurry composition, i.e., the feed to the froth flotation cell, contained 8% by wt. solids and the balance water, approximately 45% by wt. of the solids being feed ash. The particle size of the coal was typical, 95% being between 60 and 320 mesh. The flow rate of the slurry to the cell was approximately 5,000 gal/min while the addition rate of Collector C was approximately 200 ml/min. Using Collector C, the following results were obtained:

| | |
|---|---|
| Tailings Ash (Gangue) | 78.2% wt. |
| Froth Ash | 14.86% wt. |
| Recovery (Combustible Matter) | 45% wt. |
| Yield (Coal) | 53.91% |

Example 4

The procedure of Example 3 was followed with the exception that the collector was a high performance diesel substitute. The results are shown below:

| | |
|---|---|
| Tailings Ash (Gangue) | 85.07% wt. |
| Froth Ash | 16.47% wt. |
| Recovery (Combustible Matter) | 46.27% wt. |
| Yield (Coal) | 55.39% |

Comparing the results of Example 3 with Example 4, it can be seen that while the use of Collector C resulted in a lower ash coal product and a slightly lower coal yield, when corrected for ash, the yields are statistically the same in terms of recovery of combustible matter (coal).

Once again, Examples 3 and 4 demonstrate that by using the method of the present invention one can obtain yields comparable to those obtained using prior art collector.

The foregoing description and examples illustrate selected embodiments of the present invention. In light thereof, variations and modifications will be suggested to one skilled in the art, all of which are in the spirit and purview of this invention.

What is claimed is:

1. A composition for use in froth flotation comprising:

a collector comprising from 30-40% by wt. paraffins, from 15-30% by wt. olefins, from 10-15% by wt. cycloparaffins, from 10-15% by wt. esters, and from 1-6% by wt. other oxygenates.

* * * * *